Figure 3:
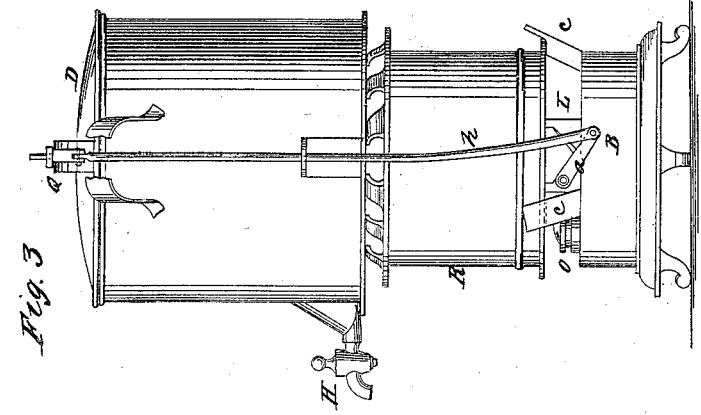

2 Sheets--Sheet 1.

E. H. HUCH.
Coffee-Pots.

No. 134,603. Patented Jan. 7, 1873.

Witnesses:
A. W. Almqvist
C. Sedgwick

Inventor:
E. H. Huch
per
Attorneys.

AM. PHOTO-LITHOGRAPHIC CO. N.Y. (OSBORNE'S PROCESS.)

E. H. HUCH.
Coffee-Pots.
No. 134,603. Patented Jan. 7, 1873.
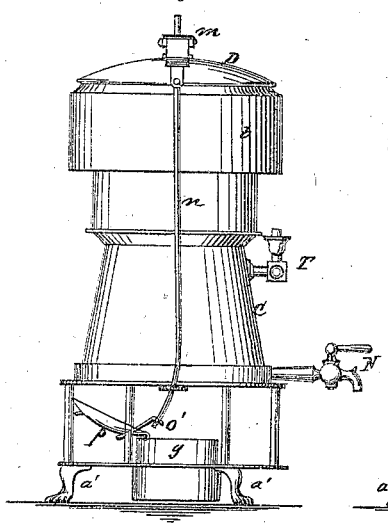
Fig. 8
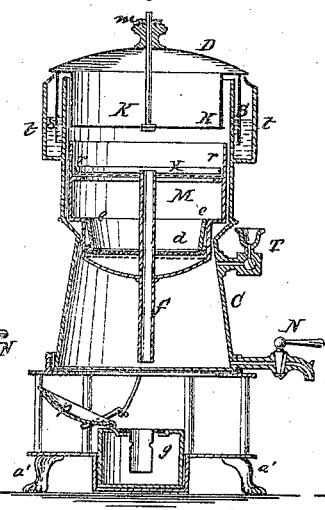
Fig. 9
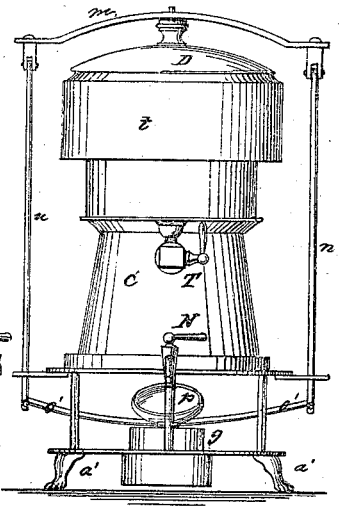
Fig. 7
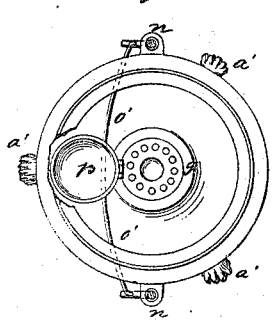
Fig. 10
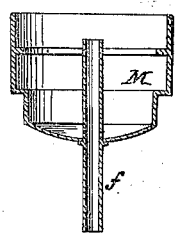
Fig. 13
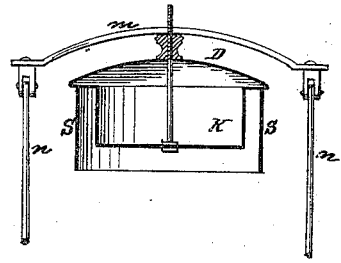
Fig. 11
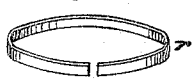
Fig. 14
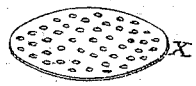
Fig. 15
Fig. 16
Fig. 17
Fig. 18
Fig. 12
Witnesses:
A. W. Almqvist
Sedgwick
Inventor:
E. H. Huch
PER
Attorneys.

UNITED STATES PATENT OFFICE.

EDWARD HEINSON HUCH, OF BRUNSWICK, GERMANY.

IMPROVEMENT IN COFFEE-POTS.

Specification forming part of Letters Patent No. 134,603, dated January 7, 1873.

*To all whom it may concern:*

Be it known that I, EDWARD HEINSON HUCH, of Brunswick, in Germany, have invented a new and Improved Apparatus for Cooking, Making Coffee, &c., of which the following is a specification:

This invention has for its object to improve the apparatus for cooking, and for making coffee and other infusions. The invention consists in the arrangement, for said purpose, of a pot which is set over a lamp, or over a gas flame, and closed air-tight by means of a cover, the rim or flange of which dips down into water contained in a deep trough that is formed around the pot. The lid of the pot is connected with the regulator of the lamp or gas flame. When steam is generated within the pot the lid commences to rise, and, acting upon the regulator, it causes the flame to be decreased in size until the steam ceases to be generated with sufficient rapidity to raise the lid higher. In this way, without any attention, and without any escape of vapor or aroma from the pot, a boiling temperature can be maintained for any desired length of time. For making coffee and similar infusions, I employ a pot over a gas or lamp flame. This pot has an inner vessel fitting closely within it at the upper part, and this inner vessel has a perforated bottom, covered with felt, flannel, or similar material, on which the coffee rests. A pipe descends through the perforated bottom of the inner vessel, nearly to the bottom of the pot. When the water in the pot boils, the pressure of the steam drives the water up the pipe into the upper vessel, and over the coffee. The water then comes in contact with the lid. The lid is made to enter and descend some distance into the inner vessel. When the water rises up to the lid, the lid floats. Being thus lifted by means of apparatus connected with it, it extinguishes the flame beneath. The steam in the lower part of the pot condenses as the pot becomes cooler, and the vacuum so formed causes the water to descend through the coffee, and the infusion is then ready to be drawn off for use. As in the cooking-pot, the lid has a rim or flange dipping into a water-trough formed around the edge of the pot, but in this case the trough is shallower.

In order that my said invention may be most fully understood and readily carried into effect, I will proceed to describe the drawing hereunto annexed.

Figure 6:
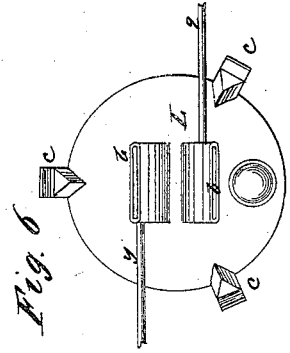
Figure 2:
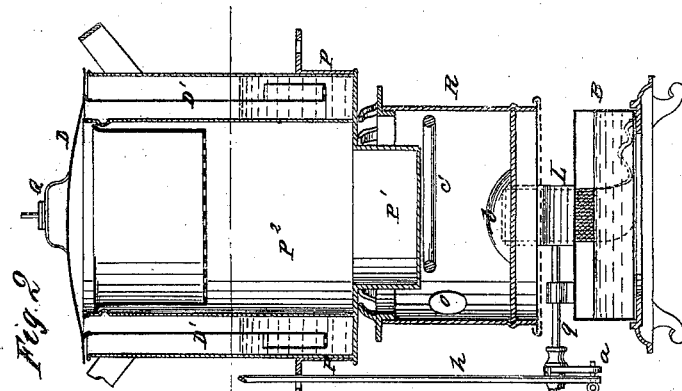
Figure 5:
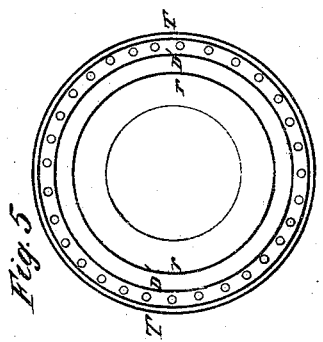
Figure 1:
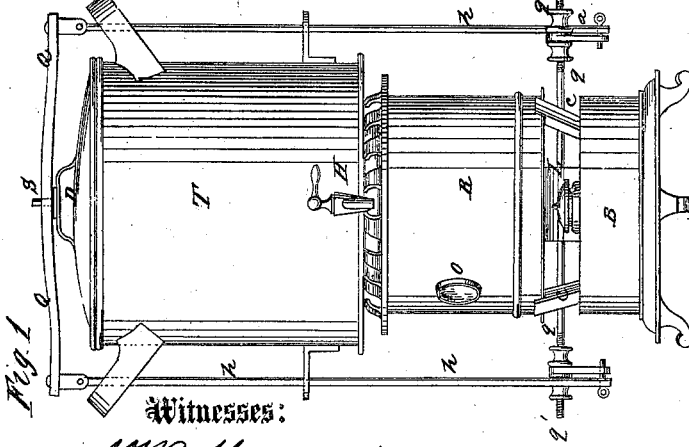
Figure 4:
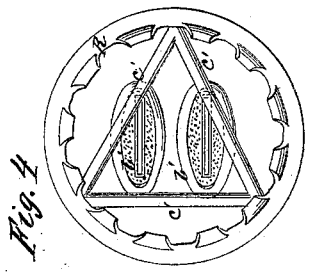

Figure 1 is a front view of a cooking apparatus, arranged according to my invention. Fig. 2 is a vertical section of the same. Fig. 3 is a side view of the same. Fig. 4 is a plan view of the metal chimney. Fig. 5 is a horizontal section of the pot. Fig. 6 is a plan of the lamp.

Similar letters of reference indicate corresponding parts.

B is a pedestal or base, on which is supported a lamp, L. The lamp shown in the drawing is adapted to burn petroleum. It has two flat wicks, $b\ b$, which can be raised and lowered by turning the arbors $g\ g$. R is a metal chimney. It rests upon the three supports $c\ c\ c$. In the bottom of the chimney are two domes, $b'\ b'$, with openings at the top, through which the flames from the wicks rise. They serve to direct the air against the flames, and to insure perfect combustion. $o$ is a glazed sight-hole in the side of the chimney. $P^1$ is the pot at its lower part, which is of smaller diameter than the upper, and enters within the chimney, where it rests upon a triangle, $c'$, which is there fixed. The upper part of the pot consists of two cylinders, P and $P^2$, one within the other, and they inclose within them an annular cavity, completely separated from and surrounding the cooking-chamber. H is a tap by which the water-space can be emptied. D is the lid. It has a flange, $D'$, descending nearly to the bottom of the water-trough around the pot, and so making a joint which remains air-tight, while the lid is free to rise and fall through a considerable space. S is a stud on the top of the lid. It receives upon it the cross-bar Q, from the ends of which light rods $h$ descend, and are jointed to arms $a$ on the axes $g\ g$.

Thus it will be seen that as the lid rises and falls with the variations of the pressure of the steam within the pot the arbors $g$ will be partly turned around, and on turning them the wicks will be raised or lowered accordingly.

When the apparatus is set to work, the wicks are adjusted so as to burn with a full flame, and by the automatic action of the apparatus the flame is reduced when the pot commences to boil.

The arms $a$ can be adjusted upon the arbors $q$, and when properly set are held fast between nuts $g'$, upon the arbors.

E is a vessel with a perforated bottom. It fits within the upper part of the pot, and is intended to receive vegetables requiring to be steamed. The pot can be arranged so as to have a set of two, three, or more of such vessels E.

Fig. 7 is a front view of a pot, constructed according to my invention, for making coffee and other infusions. Fig. 8 is a side view of the same. Fig. 9 is a vertical section of the same.

$a'$ $a'$ is a pedestal or base on which stands a pot, C. Beneath the pot is an alcohol-lamp, $g$, with a cover, $p$, and by shutting down the cover the lamp can be extinguished.

Fig. 10 is a plan of the pedestal and lamp. Fig. 11 is a vertical section of the lid. Fig. 12 is a top view of the lid. Fig. 13 is a vertical section of the inner vessel, which fits closely within the upper part of the pot. There are one or two perforations in the bottom of the inner part of the vessel, and a pipe, $f$, passes up through it. Fig. 14 is a perspective view of a spring-ring employed in the apparatus. Figs. 15 and 18 are perforated disks in the apparatus. Fig. 16 is a side view of a metal spring-ring therein. Fig. 17 is a view of a perforated disk, $d$, which is laid upon the bottom of the vessel M, and over it a piece of felt or flannel is placed, and held in position by a metallic spring-ring, $e$, which fits tightly into its place within the vessel. The ground coffee is laid upon the felt or flannel. At a distance above the coffee the vessel M receives a perforated cover, X, which is held in place by a spring-ring, $r$, and the tube $f$ terminates above the cover.

When the water in the pot boils, the water rises up the tube $f$, and descends onto the top of the coffee, and then, the lamp being extinguished, it descends again through the coffee, and is aided in so doing by the vacuum resulting from the condensation of the steam in the pot $c$, or the tube $f$ may terminate at the bottom of the vessel M, which, in this case, is not perforated, and the water passes through the coffee both in rising and descending.

D is the lid of the pot, Fig. 11. It is hollow, and its lower part N enters some distance into the upper part of the pot.

When the water rises in the pipe $f$ it comes in contact with the lid and floats it, and when the lid thus rises it closes, by means of the descending arms $n$ and cross-bars $o'$, the lid $p$ of the lamp. The lid D has a descending flange, $s$, upon it, which dips into the water-trough $t$, formed around the mouth of the pot.

N is a tap for drawing off the coffee, and T an air-tap, which is opened when drawing out by the tap N, in order to obtain a free flow. The tap T has a funnel upon it, and may also be used in pouring water into the pot.

Having thus described my invention, I claim as new and desire to secure by Letters Patent—

1. The lid D, made up-and-down adjustable, and dipping into an annular water-space to close tight the vessel it covers, as set forth.

2. The up-and-down adjustable lid D, connected with the lamp-closing or wick-adjusting devices to regulate the flame automatically, as specified.

3. Such construction of pots for making coffee and other infusions that when the pressure of the steam raises the water from a lower to an upper vessel the water acts upon a float, and in so doing gives motion to instrument which extinguishes the flame, substantially as described.

E. HEINSON HUCH.

Witnesses:
   RUD. LÖHNEFINKE,
   ALBERT KOCH.